United States Patent [19]
Walker et al.

[11] Patent Number: 5,129,221
[45] Date of Patent: Jul. 14, 1992

[54] GAS TURBINE ENGINE FUEL CONTROL SYSTEM WITH ENHANCED RELIGHT CAPABILITY

[75] Inventors: Joseph H. Walker; Malcolm R. Sellar; Keith Robson, all of Derby; William G. Mansfield, Burton on Trent; Donald A. Yates, Derby, all of England

[73] Assignee: Rolls-Royce plc, London, England

[21] Appl. No.: 526,028

[22] Filed: May 21, 1990

[30] Foreign Application Priority Data

May 23, 1989 [GB] United Kingdom ............... 8911806

[51] Int. Cl.⁵ ............................................. F02C 7/262
[52] U.S. Cl. ................................ 60/39.02; 60/39.141
[58] Field of Search ............ 60/39.091, 39.13, 39.141, 60/39.281, 39.821, 39.827, 39.02

[56] References Cited

U.S. PATENT DOCUMENTS

| | | | |
|---|---|---|---|
| 4,044,551 | 8/1977 | Nelson et al. | 60/39.141 |
| 4,062,186 | 12/1977 | Snow et al. | 60/39.141 |
| 4,218,878 | 8/1980 | Kiscaden et al. | |
| 4,245,462 | 1/1981 | McCombs | 60/39.281 |
| 4,276,743 | 7/1981 | LaGrone | 60/39.141 |
| 4,490,791 | 12/1984 | Morrison | |
| 4,597,359 | 7/1986 | Moore et al. | 60/39.141 |

FOREIGN PATENT DOCUMENTS

| | | |
|---|---|---|
| 1330853 | 9/1973 | United Kingdom |
| 2192670 | 1/1988 | United Kingdom |
| 2212275 | 7/1989 | United Kingdom |

*Primary Examiner*—Louis J. Casaregola
*Attorney, Agent, or Firm*—Cushman, Darby & Cushman

[57] ABSTRACT

A relight fuel flow schedule controls fuel flow to the combustor of a turbofan aeroengine during in-flight relight procedures. A first fuel ramp, whose slope decreases with increasing altitude, enables the combustor to light with minimum fuel flow for the altitude and thus helps to prevent overfueling. The fuel flow rate undergoes a step reduction, after detection of satisfactory combustion, to prevent compressor stall, but cannot drop below a predetermined level to guard against flameout. The first fuel ramp is repeated if satisfactory combustion does not occur. After a successive relight a second fuel ramp is varied from flat to positive slope depending on the ratio of the rate of change of high pressure compressor speed to a datum level in order to prevent a hung start and accelerate the engine until normal acceleration control laws takes over.

26 Claims, 5 Drawing Sheets

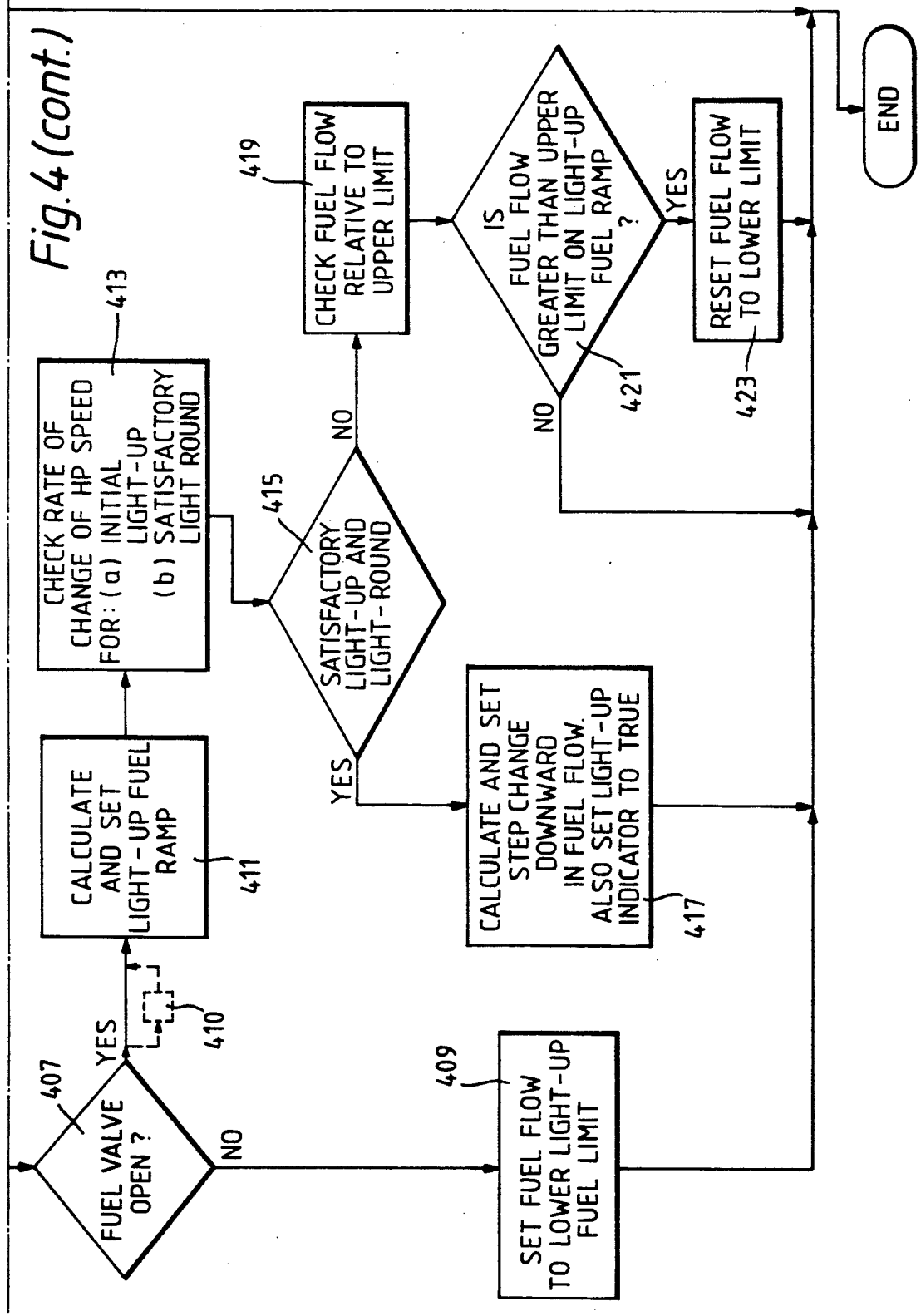

GAS TURBINE ENGINE FUEL CONTROL SYSTEM WITH ENHANCED RELIGHT CAPABILITY

BACKGROUND OF THE INVENTION

1. Field of the Invention

This invention relates to electronic fuel control systems for gas turbine aeroengines, and in particular to enhancement of such systems for the purpose of improving the reliability of relighting of the engines.

To relight a turbofan or similar engine, the forward speed of the aircraft is used to induce "windmilling" of the engines' bladed rotors due to impingement of the air stream on them. This provides mechanical power for engine-driven accessories such as fuel pumps and enables a relight to be attempted using continuously operated electrical igniters in the combustor.

2. Description of the Related Art

Prior to the present invention, relighting gas turbine aeroengines in flight was tackled by simply causing the fuel system to provide a nominally constant low fuel flow to the combustion chambers while the speed of the engine's high pressure spool increased. Upon achievement of a satisfactory light-up, the system switched to a normal acceleration schedule of increasing fuel flow to enable engine power to be built up to a satisfactory level. In order to cope with the effect of low air temperatures, a switch was provided to enable a higher constant fuel flow for relight at air temperatures below a certain predetermined value.

Previously, such a relight fuel flow schedule was implemented in a hydromechanical fuel system, but with the advent of full authority digital electronic systems, the same type of relight schedule was merely transferred to them and implemented in software rather than hardware.

In the event of one or more of a civil aircraft's engines being extinguished, the ability of the engines to relight quickly and reliably is an important safety consideration, particularly so in the case of extended range operations (EROPS). Unfortunately, relightability of gas turbine aeroengines decreases with altitude. In general the fuel flow needed for ignition gets progressively higher with altitude, due to low air pressure at the entrance to the combustion chamber, but the precise fuel flow required for a satisfactory light-up becomes less predictable as altitude increases. Consequently, in the unlikely event of an engine being extinguished at high altitude, existing fuel systems have made it necessary for the aircraft to descend to an altitude more favourable for relighting. This manoeuvre is undesirable from a safety point of view, and the need for the aircraft to climb back up to the desired operating altitude imposes a fuel consumption penalty.

SUMMARY OF THE INVENTION

The present invention achieves more reliable relights at higher altitudes by using more sophisticated fuel control laws than have been hitherto incorporated in fuel control systems.

According to a first aspect of the present invention, a relight fuel flow scheduler controls fuel flow to the combustor of a gas turbine aeroengine during an initial phase of an in-flight relight procedure by progressively increasing the fuel flow with respect to time from a low initial level towards a higher maximum level, thus enabling an electronic fuel control system in which the scheduler is incorporated to seek out an optimum fuel flow for achieving satisfactory combustion.

According to a second aspect of the invention, once satisfactory combustion has been achieved, the relight fuel flow scheduler adjusts fuel flow by means of a decrease thereof in order to prevent excessive heat release from the combustion process from causing the compressor of the aeroengine to stall, the decrease being less than that necessary to cause flame-out.

According to a third aspect, after the decrease in fuel flow, a satisfactory acceleration of the engine rotors to idling speed is achieved by comparing the acceleration of one of the rotors with a datum light-up acceleration schedule and adjusting fuel flow as necessary to at least maintain the schedule.

The above relight fuel flow scheduler is preferably implimented in software incorporated in an electronic fuel control system of the aeroengine and preferably comprises at least all three of the above aspects.

The invention may be further defined as a relight fuel flow scheduler for controlling fuel flow to the combustor of a gas turbine aeroengine during an in-flight relight procedure, comprising at least the following elements:

(i) means for seeking an optimum fuel flow for satisfactory combustion conditions at an altitude at which relight is being attempted;

(ii) means for testing for the existence of satisfactory combustion conditions and means for adjusting the fuel flow in accordance with the result of the testing to avoid misfueling the engine;

(iii) means for comparing the resulting acceleration of an engine rotor with a datum light-up acceleration schedule and means for adjusting the fuel flow in accordance with the result of the comparison to maintain at least the datum light-up acceleration schedule.

The invention also includes the methods of controlling fuel flow to the combustor of a gas turbine aeroengine which are implemented by the above-mentioned relight fuel flow scheduler.

Further aspects of the invention will be apparent from a perusal of the accompanying description and claims.

BRIEF DESCRIPTION OF THE DRAWINGS

An embodiment of the invention will now be described, by way of example only, with reference to the accompanying drawings in which.

DETAILED DESCRIPTION OF THE PRESENTLY PREFERRED EXEMPLARY EMBODIMENTS

Figure 1:
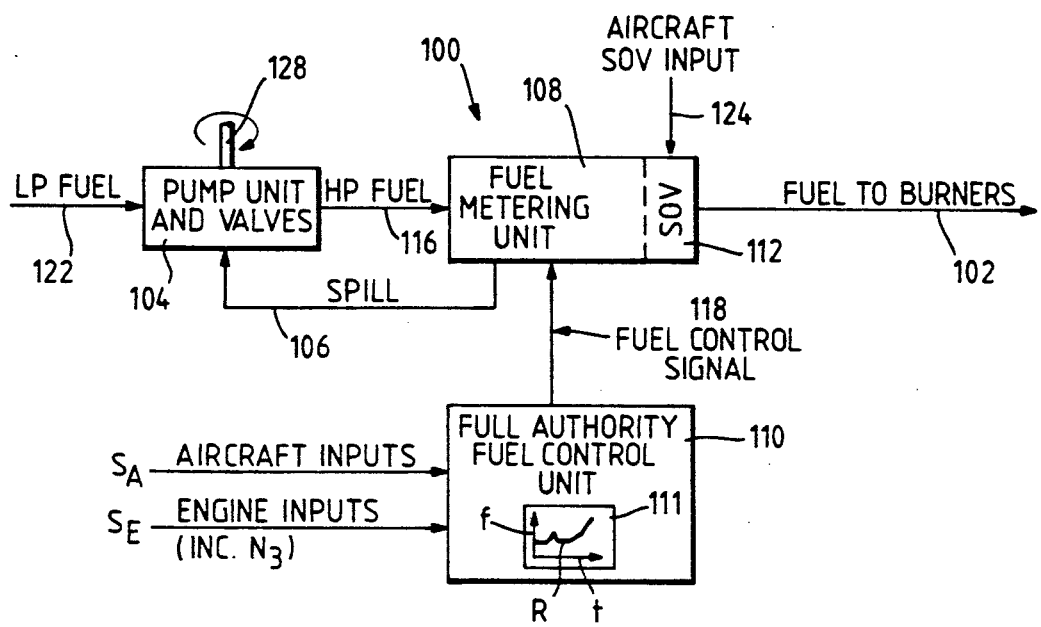
FIG. 1 is a block diagram illustrating in simplified form a fuel control system for a triple spool gas turbine aeroengine, which control system incorporates a relight fuel scheduler software module in accordance with the present invention.

Referring first to FIG. 1, a control system 100 controls the fuel flow 102 to a three spool gas turbine aeroengine (not shown), comprising low, intermediate and high pressure spools. In brief, the control system 100 comprises various units including a mechanical fuel pump 104, a pump spill return circuit 106, an electromechanical fuel flow metering unit 108, a main engine digital electronic control unit 110 incorporating a relight fuel scheduler software module 111, and a shut-off valve 112, which is integrated with the fuel metering unit 108.

The fuel control unit has full authority over the fuel flow 102 to the aeroengine by means of fuel control signal 118 to the fuel metering unit 108. It may also have authority over other engine functions.

In operation, the fuel 122 at low pressure is pumped up to a high pressure in the fuel line 116 by the fuel pump 104, the output of which is throttled by the fuel metering unit 108. The latter item controls the output of the pump 104 in accordance with the fuel control signal 118 produced by the fuel control unit 110. The fuel control unit 110 receives a number of signals $S_A$ and $S_E$ comprising respectively inputs from the aircraft flight station and inputs from various speed, temperature and pressure sensors in the engine. In the present case, signals $S_E$ include the high pressure spool speed $N_3$. As known in the industry, the fuel flow control unit 110 applies certain predetermined control laws to the signals $S_A$ and $S_E$ for normal and contingency control of the engine and thereby produces the fuel control signal 118. However, in addition the relight fuel scheduler software module 111 comprises a novel control law which when the engine requires relighting during flight above a certain altitude, overrides the other control laws and modulates the fuel control signal 118 to obtain an appropriate fuel flow schedule R for relighting, R being the variation of fuel flow f with time t.

Most of the time, including during operation of the relight scheduler, the engine requires less fuel than the pump unit 104 is capable of delivering. Hence, when the metering unit 108 is exercising its throttling function under command from the fuel control unit 110, there is a back pressure in the fuel line 116 causing opening of a bypass valve (not shown) controlling fuel flow through the spill return loop 106. This bypass valve may be within metering unit 108 or pump unit 104. The excess fuel passed by the bypass valve then passes back to the inlet of the pump 104 for recirculation.

Finally, the metered fuel 102 is passed to the burners in the combustion chambers of the engine through the shut-off valve unit 112, whose purpose is completely to prevent fuel flow to the engine when the engine is shut down or before it is started, this being achieved by electrical actuation signals 124 from the flight station of the aircraft.

Regarding the fuel pump 104, this is driven by shaft 128 through a gear train (not shown) from one of the shafts of the aeroengine and its output is directly proportional to the speed at which it is driven.

Although not indicated in the diagram, the control system 100 is located on or adjacent the outer casings of the aeroengine.

Figure 2:
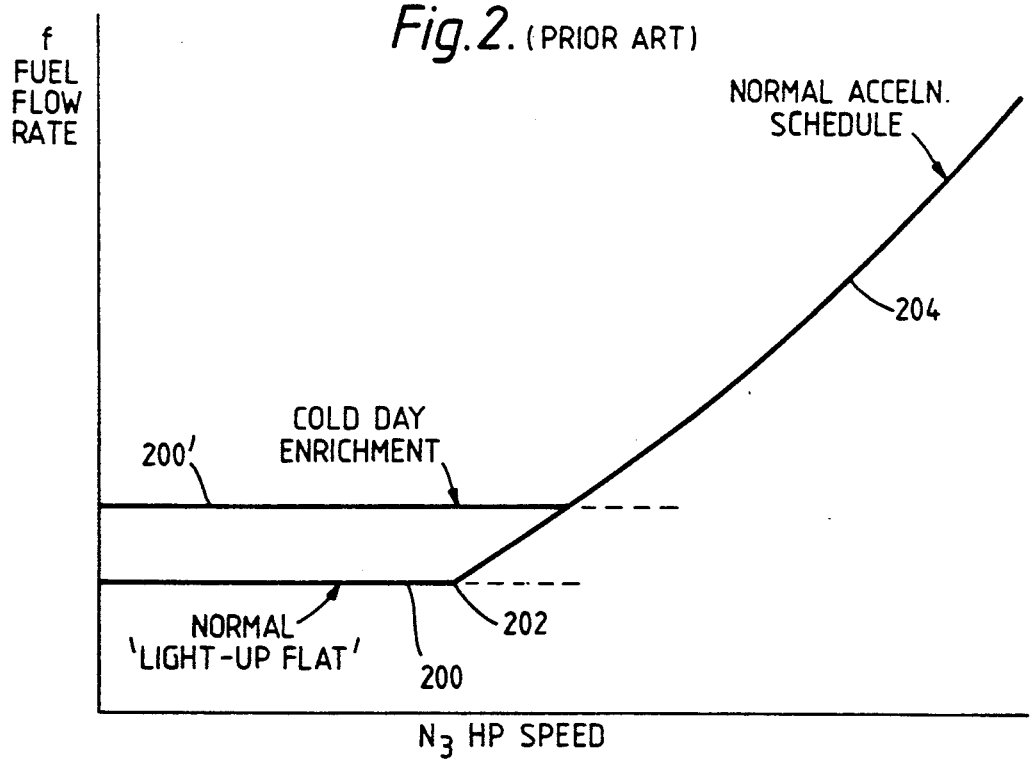
FIG. 2 is a prior art "light-up flat" type of fuel flow control schedule.

Turning now to FIG. 2, there is shown a graphical representation of a typical prior art fuel flow schedule 200 for normal ground-level light-up of a turbofan engine, the same schedule also being utilised for relights. It will be seen that this schedule is expressed as a plot of fuel flow rate f against the rotational speed $N_3$ of the engine's high pressure spool, and can be implimented in either a hydromechanical control system or as a software module in an electronic unit.

After opening of the fuel shut-off valve (112 in FIG. 1), schedule 200 involves controlling the fuel metering unit 108 to provide a fuel flow to the combustion chambers which is nominally constant with increasing h.p. spool speed $N_3$. This is the so-called "light-up flat" characteristic. Given favourable conditions, ignition of the fuel and properly sustained combustion occurs at some point 202 along line 200, whereupon the control on the fuel flow is changed, preferably automatically, to conform to a normal acceleration schedule 204 for which fuel flow f is increased with high pressure spool speed $N_3$ until a satisfactory idling speed in achieved, from which the power of the engine can be increased in any desired way in accordance with other normal control laws.

Because greater fuel flow is required for ignition when the air with which it is mixed in the combustion chambers is cold, an alternative "light-up flat" schedule 200' is utilised when the ambient temperature is below a certain threshold value. This "cold-day enrichment" may be selectable by the pilot or it may be provided automatically by the fuel control system.

It will be seen from the above that the known "light-up flat" type of light-up and relight fuel schedule does not allow for the difficulties of ignition and sustained combustion at high altitudes, or for other known difficulties which can afflict turbofans during high altitude relights, such as compressor stall or inadequate acceleration to a proper idling speed.

In contrast, the relight fuel flow scheduler software module 111 indicated in FIG. 1 does cope with such eventualities, and its operation will now be explained with reference to FIGS. 3 to 5.

Figure 3:
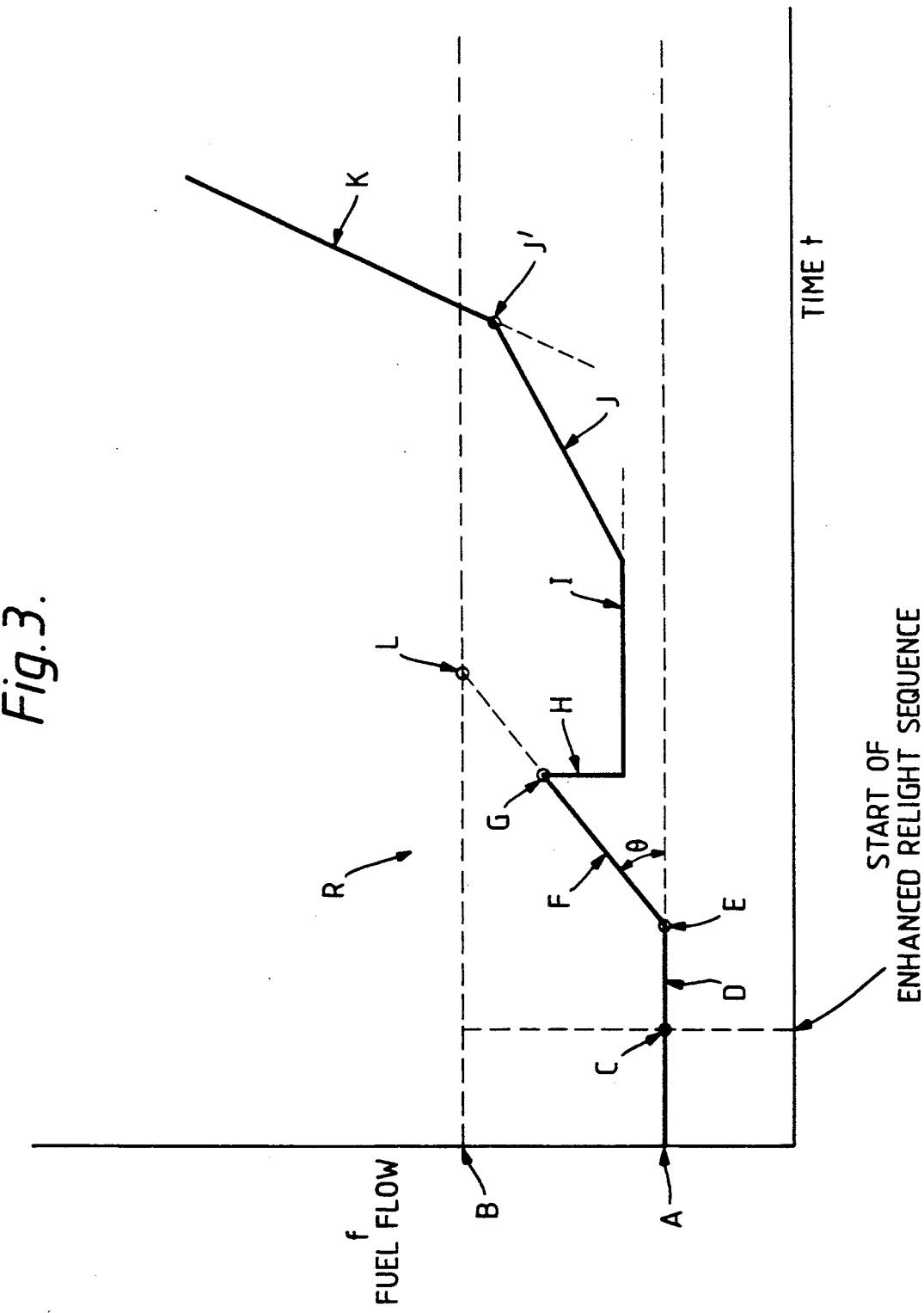
FIG. 3 shows a relight fuel flow schedule in accordance with the present invention.

The logic shown in the software flow chart of FIG. 4 controls the hardware to schedule the fuel flow in the following major ways as seen in FIG. 3:

i) It seeks out the optimum fuel flow f for successful ignition and combustion at the altitude at which relighting is being attempted. It does this by gradually increasing fuel flow with respect to time as a function of altitude and preferably also air speed, as shown by ramp line F, within limits defined by A and B, which are also defined as a function of altitude at least.

ii) It tests for the continued existence of satisfactory combustion conditions by comparing the rate of change of high pressure spool speed $N_3$ with a predetermined lower value of rate of change of $N_3$, and by comparing the time taken for the rate of change of $N_3$ to pass upwards through lower and upper predetermined values with predetermined time periods. If they are satisfactory, it stops the increase in fuel flow at G and causes a decrement in fuel flow along line H, the magnitude of which is a function of altitude and preferably also air speed and also depends on the characteristics of the engine type as determined by test data.

iii) It compares the rate of change of $N_3$ with that demanded by a datum light-up acceleration schedule control law incorporated in fuel control unit 110 for normal light-up procedures, maintaining fuel flow steady at the same rate along line I for as long as the actual acceleration of $N_3$ is the same as or greater than the datum, but steadily increasing fuel flow along line J when the actual acceleration of $N_3$ is less than the datum, so as to restore a proper acceleration level.

In addition, provision is made for a normal acceleration control law, represented by line K, to take over from the relight acceleration control law, represented by line J, at some point J' determined by a highest wins logic.

Figure 4:
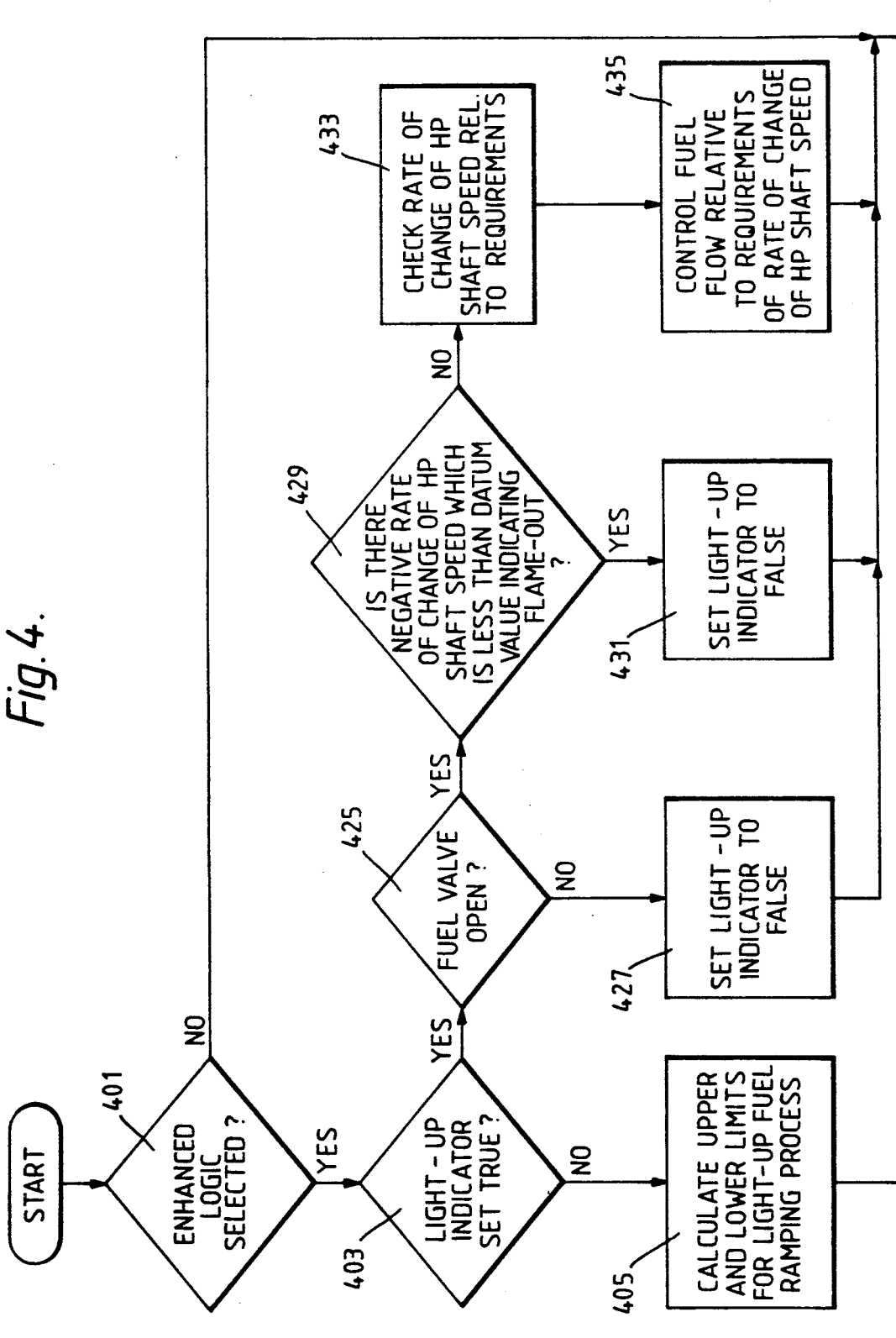
FIG. 4 is an illustrative flow chart for the above-mentioned software module which is capable of enabling the fuel control system of FIG. 1 to implement the fuel flow schedule of FIG. 3.
Figure 5:
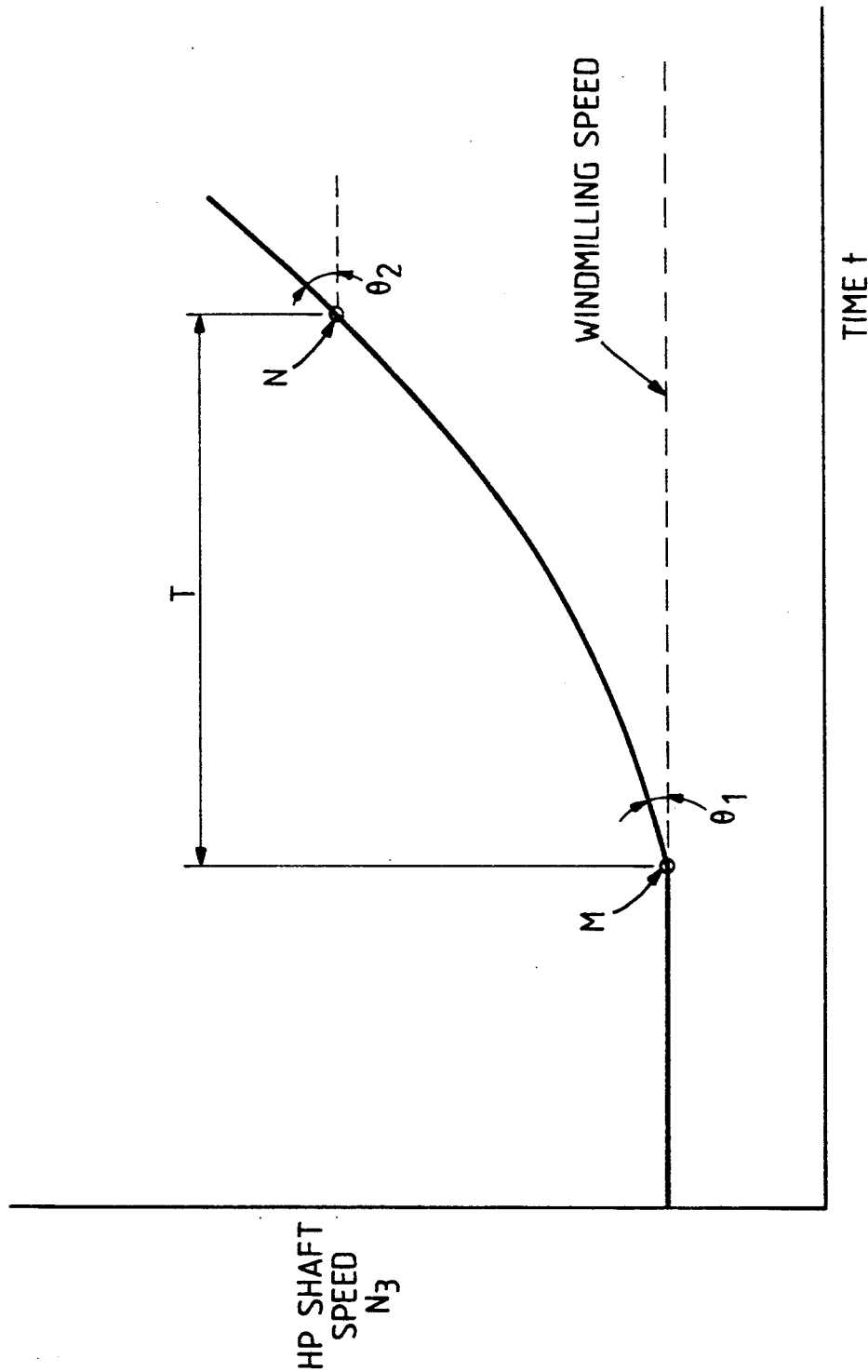
FIG. 5 illustrates a principle of detection of combustion quality useful for incorporation in the above-mentioned software.

Looking at FIGS. 3 and 4 in more detail, the logic represented in FIG. 4 is reiterated from START to END (but along varying paths as necessary) an appropriate number of times per second, say about nine or ten. The first decision made, at 401, is whether or not the relight software module has been selected. In the first place this depends upon whether the pilot has selected the engine starting sequence by depressing a switch in the flight station linked to the control unit 110, FIG. 1. Note that igniters are also activated by the start switch. Assuming depression of the start switch, selection of the relight software module is automatic, depending on an input from another software module (not shown) in control unit 110 (FIG. 1) which monitors altitude and airspeed data present on the aircraft data bus against minimum altitude and airspeed limits. If both the monitored altitude and the monitored airspeed are above the minimum limits, an AND logic gives an output flag bit which if present triggers a YES from decision 401 and if not present triggers the NO. In the latter case the logic goes to END and returns to START at the next iteration but in the former case the logic progresses to decision 403.

Decision 403 examines a "light-up indicator", which is another flag bit in a register, indicating TRUE if the fuel is alight and $FALS_E$ if not. The flag is set by logic later in the sequence. If the light-up indicator is set $FALS_E$, then the logic progresses to action 405, which calculates the lower and upper limits of allowable fuel flow for achieving ignition, these being shown as A and B respectively in FIG. 3. Limits A and B are calculated as a function of altitude, the function being fixed by reference to suitable altitude test cell and flight test calibrations for the engine type involved. In general, A and B will move closer together with increasing altitude.

After action 405, decision 407 looks at a flag which indicates whether the fuel shut-off valve 112 in FIG. 1 is open or closed. The flag is set by a positional feedback signal from the valve 112 to the control unit 110. If the pilot has not yet selected the valve open at the flight station, then the relight sequence has plainly not yet begun and all that remains is for action 409 to set the fuel flow to the lower limit A in readiness for relight selection during a later iteration of the relight logic sequence. A particular fuel flow setting is of course achieved by causing the control unit 110 to output an appropriate fuel control signal 118 to the fuel metering unit 108.

Opening of the shut-off valve 112 after a decision 403 in the negative is what actually initiates the enhanced relight logic sequence as shown at point G in FIG. 3, a YES answer to decision 407 allowing the logic to proceed to action 411, in which the required rate of increase of fuel flow, i.e. steepness of ramp line F (angle $\theta$) in FIG. 3 is calculated as a function of altitude and airspeed. Once again, the exact value of the function is derived from engine testing. However, before action 411 is implimented for the first time after valve opening, it is highly desirable that time is allowed for the fuel to flow from the shut-off valve 112 to the burners (not shown) and become a properly atomised spray in the combustor. Consequently, time delay 410 is triggered by opening of the valve 112 and is present in the logic sequence between 407 and 411 only during the first iteration after opening of the valve 112. During time delay 410 the fuel flow rate allowed by metering unit 108 remains constant at the lower limit A, as shown by horizontal line D.

It should be noted that the steepness of line F may change quite rapidly in flight due to rapid changes in aircraft altitude and airspeed; the architecture of the software and its reiteration rate ensures that the fuel ramp rate-of-flow values are updated a number of times each second for as long as the light-up indicator 403 remains FALSE.

Next the software at 413 detects satisfactory fuel ignition, in terms of light-up and light-round of the combustor, by monitoring the rate of change of high pressure spool speed, $N_3$. The concepts of light-up and light-round will be explained before proceeding further.

By means of test bed and flight test work with appropriately instrumented engines, it is possible with each engine type to categorise their fuel ignition characteristics with respect to: rapidity of initial formation of a strong flame at one location in the combustor, i.e. "light-up"; rapidity of travel of the flame circumferentially around the combustor from burner-to-burner, i.e. "light-round"; and rapidity of rise of temperature of gases in the turbine as a result of light-up and light-round, termed TGT rise.

Several general patterns of light-up and light-round were identified in tests on a large modern turbofan engine without use of the enhanced control of fuel scheduling disclosed herein. The patterns were:

(1) Rapid light-up and light-round with fast T.G.T. rise.
(2) Slow light-up and light-round with fast T.G.T. rise.
(3) Slow light-up and light-round with slow T.G.T. rise.
(4) Slow light-up with slow T.G.T. rise followed by rapid T.G.T. rise on light-round.
(5) Slow light-up with fast T.G.T. rise, but unstable; appears to extinguish and relight repeatedly.

These patterns appeared in different zones of a plot of altitude against airspeed. Pattern 1 was ideal, being obtainable at low to medium altitudes (say up to 25000 feet) and over a wide range of airspeeds for "windmill" starts. Pattern 2 was obtained at altitudes somewhat above pattern 1, but only towards the low end of the airspeed range over which windmill starts are possible. Both patterns 1 and 2 generally produced satisfactory starts provided that the subsequent fuel schedule was sufficient to drive the engine up to flight idling speed, a problem addressed by the present embodiment as described later. Patterns 3 and 4 were obtained at higher altitudes than pattern 2 (say up to 40000 feet) but at the low end of the airspeed range. Unless given special fuel scheduling as described herein, pattern 3 tended to result in inadequate acceleration of the engine speed and pattern 4 in either stalling of the compressor or non-acceleration of the engine. Pattern 5 occured at similar altitudes to patterns 3 and 4 but at somewhat higher airspeeds. Again, it was inadequate to accelerate the engine to a proper idling speed, but proper fuel scheduling as disclosed herein can make it satisfactory.

Returning now to consideration of action 413, mentioned previously, it will be explained in more detail how the rate of change of the $N_3$ is used to check for satisfactory light-up and light-round.

A simple way of achieving this, which we have found satisfactory for altitudes up to about 30000 feet, is to compare the rate of change of high pressure spool speed $N_3$ against a threshold value which is invariably achieved when light-up and light-round are satisfactory. This is illustrated in FIG. 5, where on a plot of high pressure spool speed $N_3$ against time t, the graph starts on a horizontal straight line at a low value of $N_3$ representing the spool rotational speed achieved by "windmilling" the engine. At point M, initial light-up is achieved as shown by the sudden acceleration of $N_3$ expressed by slope $\theta_1$. Acceleration continues through point N on the graph, where rate of change of $N_3$ reaches the threshold value $\theta_2$, showing that light-up and light-round are acceptable. Threshold value $\theta_2$ is achieved in time T after initial light-up, T being variable according to the quality of the start.

A more sophisticated version can accommodate the light-up patterns found at greater altitudes, as well as those found below 30000 feet. Again, FIG. 5 can be used to illustrate it. Instead of a single threshold value $\theta_2$ of $N_3$ acceleration being used, two are established, namely a lower threshold value $\theta_1$ indicative of satisfactory initial light-up, and an upper threshold value $\theta_2$ sufficiently greater than $\theta_1$ that the time T taken for $N_3$ to accelerate between them can be taken as a measure of the "goodness" of the start in terms of light-round. Hence, if time T is less than a certain calibrated value, then the start is acceptable. It should be realised that $\theta_2$ in the simple embodiment is not necessarily the same value as $\theta_2$ in the more sophisticated embodiment, even though both are described with reference to FIG. 5.

For guidance, following tests on a large turbofan engine, the following values of T were adopted as satisfactory for controlling duration of the light-up fuel ramp F and time of initiating the step decrement H in the ways indicated.

(i) If the lower and upper thresholds were achieved in less than three seconds, the fuel ramp was nevertheless continued for the full three seconds and then the step decrease was performed immediately afterwards.

ii) If the upper threshold was achieved between three and twelve seconds after the lower threshold, the step decrease was performed immediately upon achieving the upper threshold.

iii) If the lower and upper thresholds were achieved in a time greater than twelve seconds, this was taken to indicate a slow light-round, and the light-up fuel ramp was continued for a further five seconds. If during this period the upper fuel flow limit B was reached by virtue of the continued fuel ramping, then the step decrease was not applied until the five seconds had elapsed, the fuel flow meanwhile remaining at the upper limit B.

It should be emphasised however that the above values are merely exemplary and will differ as between different makes of turbofan and between different marques of the same turbofan engine series.

Continuing now at decision 415 in the logic diagram, and assuming that its output is NO, action step 419 compares the actual fuel flow rate (known from a flow meter connected to the control unit 110) with the upper light up limit B (FIG. 3). If the actual fuel flow is greater than limit B, meaning that the engine has failed to light properly during present fuel ramp F, decision 421 gives a YES output and action 423 resets the actual fuel flow to the lower limit A so that another fuel ramp F can be started in the next iteration, the relight fuel flow schedule effectively being begun again from point E. On the other hand, if the actual fuel flow is still less than limit 3 during the present iteration, decision 421 gives a NO result and the fuel ramp is continued through the next iteration.

Returning now briefly to action 411, it has already been explained that the first part of the relight fuel schedule is a fuel ramp F whose steepness is carefully controlled so as to enable the optimum light-up fuel flow to be achieved for a particular altitude and forward speed. The fuel ramp causes a high fuel flow at light-up, and consequently, having lit, there is a large heat release, which could drive the engine's high pressure compressor into a stall condition, particularly at the higher altitudes. Consequently, having detected a satisfactory start at logic step 415 by checking the rate of change of $N_3$ at 413, the logic step 417 stops the fuel ramp at G and causes a step change downward in fuel flow along line H in order to prevent stall initiation. However, such a step change downwards is only practical because once having obtained a satisfactory light-up and light-round, the combustion process can be maintained at lower fuel flows; plainly, the reduction in fuel flow must not be such as to extinguish the flame. The maximum amount by which the fuel flow can be reduced at step H without flameout is determined by engine testing over the relight altitude range (and also preferably the airspeed range) and this data is included in a lookup table in the software. This provides a baseline level of fuel flow below which the actual fuel flow is not allowed to fall. The actual amount of fuel flow reduction is a function of altitude (and preferably airspeed) and usually results in a fuel flow somewhat higher than the baseline. Again, the function used is based on calibration tests.

Before completion of the software iteration cycle, it will be seen that step 417, consequent on a satisfactory light-up being detected at 415, also sets the light-up indicator flag to TRUE so that on the next iteration, the logic branches in the YES direction at decision step 403 in order to enter a different subroutine for monitoring the continuing combustion situation.

After a YES output from decision 403, a NO output from decision 425 indicates that the position of the shut-off valve 112 has been checked and it has been found to be closed. This shows that a "shut" command from the flight station has been received and implimented. Consequently, it is necessary to set the light-up indicator flag to FALSE at decision 427 in order to redatum the logic ready for the possibility of another relight attempt. A YES output from decision 425 indicates that the valve 112 is still open and the logic then proceeds to decision 429, checking the rate of change of $N_3$ against a negative datum value of $N_3$ which has been found by testing to reliably indicate a flame-out. This allows for the possibility that after an apparently satisfactory light-up and light-round as validated by logic steps 413 and 415, the flame may still be extinguished because of a number of factors. In such a case, the output of decision 429 will be YES and the light-up indicator flag must again be set to FALSE by action 431 so as to redatum the logic as before.

Assuming now that decision 429 gives a NO output, indicating continuation of a successful light-up, action 433 then compares the rate of change of $N_3$ with values contained in a datum light-up schedule which have been found by experience to be necessary for a successful transition to flight idle speeds and normal control of the engine. Action 435 then controls the fuel flow as has already been explained in connection with lines I and J in FIG. 3.

It should be pointed out that the use of high pressure spool speed as an indicative engine condition or parameter for judging combustion conditions is not the only possibility. For instance, it would be possible to use turbine gas temperature or perhaps even the pressure of the air at the outlet from the last stage of the compressor.

A problem which arises with the use of electrical signals such as that which represents high pressure spool speed is that they can be noisy due to electrical or electromagnetic interference. This could for instance cause the step reduction of fuel to be triggered due to anomalously high values falsely indicating a light-up. This can be countered by suitable analogue or digital filtering of the signals. For instance, it is simple to implement a counter in the software which requires that the lower and/or upper limits of the rate of change of $N_3$ ($\theta_1$ and $\theta_2$ in FIG. 5) must be passed by the rate of change of $N_3$ signal more than a specified number of times within a specified period in order to be considered valid.

We claim:

1. In an electronic fuel control system, a relight fuel flow scheduler for controlling fuel flow to the combustor of a gas turbine aeroengine during an in-flight relight procedure in order to achieve a satisfactory relight schedule comprising:
   (i) means for varying said fuel flow to achieve satisfactorily combustion conditions at an altitude for which relight is being attempted;
   (ii) means for testing for the existence of satisfactory combustion conditions and means for adjusting the fuel flow in accordance with the result of the testing to avoid misfueling the engine; and
   (iii) means for comparing the resulting acceleration of an engine rotor with a datum light-up acceleration schedule and means for adjusting the fuel flow in accordance with the result of the comparison as necessary to maintain at least the datum light-up acceleration schedule.

2. A relight fuel flow scheduler according to claim 1 in which said means for varying said fuel flow to achieve satisfactory combustion conditions comprises means for progressively increasing fuel flow from a lower predetermined limit towards an upper predetermined limit at a rate which is a function of altitude at least.

3. A relight fuel flow scheduler according to claim 2 in which the rate of increase of fuel flow is a function of both altitude and airspeed.

4. A relight fuel flow scheduler according to claim 1 in which said means for testing for satisfactory combustion conditions comprises means for measuring the value of the rate of change of an indicative engine condition, comparing said measured value with a predetermined threshold value of the rate of change of said engine condition, and giving an indication of satisfactory combustion conditions if said measured value is not less than said predetermined threshold value.

5. A relight fuel flow scheduler according to claim 1 in which said means for testing for satisfactory combustion conditions comprises means for measuring the time taken for the rate of change of said engine condition to pass upwards through predetermined low and high threshold values thereof and means for comparing said measured time with at least one predetermined time period and giving an indication of satisfactory combustion conditions if said measured time is not greater than said at least one predetermined time period.

6. A relight fuel flow scheduler according to claim 1 in which said means for adjusting the fuel flow in accordance with the result of the testing comprises means for causing a decrease in fuel flow if the combustion conditions are satisfactory, and said means for causing a decrease also varying the magnitude of the decrease as a function of altitude at least.

7. A relight fuel flow scheduler according to claim 1 in which said means for adjusting the fuel flow in accordance with the result of the testing comprises means for causing a decrease in fuel flow if the combustion conditions are satisfactory and said means for causing a decrease also varying the magnitude of the decrease as a function of altitude and airspeed.

8. A relight fuel flow scheduler according to claim 4 in which the indicative engine condition is high pressure spool speed.

9. A relight fuel flow scheduler according to claim 4 in which the indicative engine condition is compressor exit pressure.

10. A relight fuel flow scheduler according to claim 4 in which the indicative engine condition is turbine gas temperature.

11. A relight fuel flow scheduler according to claim 1 in which said means for comparing the result acceleration of an engine rotor with a datum light-up acceleration schedule compares the rate of change of a high pressure spool speed with said datum.

12. A relight fuel flow scheduler according to claim 1 in which said means for adjusting the fuel flow in accordance with the result of the comparison maintains a constant fuel flow for as long as the actual acceleration of the rotor is the same as or greater than the datum light-up acceleration schedule, and steadily increases fuel flow so as to restore a proper acceleration level when the actual acceleration is less than the datum light-up acceleration schedule.

13. In an electronic fuel control system, a relight fuel flow scheduler according to claim 1 and a highest wins logic means for enabling a normal acceleration control low to take over from the relight fuel flow scheduler when accelerations under control of the former become greater than accelerations under control of the latter.

14. A method of controlling fuel flow to the combustor of a gas turbine aeroengine during an in-flight relight procedure in order to achieve a satisfactory relight schedule comprising the following steps:
   (i) varying said fuel flow to achieve satisfactorily combustion conditions at an altitude for which relight is being attempted;
   (ii) testing for the existence of satisfactory combustion conditions and adjusting the fuel flow in accordance with the result of the testing to avoid misfueling the engine;
   (iii) comparing the resulting acceleration of an engine rotor with a datum light-up acceleration schedule and adjusting the fuel flow in accordance with the result of the comparison as necessary to maintain at least the datum light-up acceleration schedule.

15. A method according to claim 14 in which said step of varying said fuel flow to achieve satisfactory combustion conditions includes progressively increasing fuel flow from a lower predetermined limit towards an upper predetermined limit at a rate which is a function of altitude at least.

16. A method according to claim 15 in which the rate of increase of fuel flow is a function of both altitude and airspeed.

17. A method according to claim 14 in which said step of testing for satisfactory combustion conditions comprises measuring the value of the rate of change of an indicative engine condition, comparing said measured value with a predetermined threshold value of the rate of change of said engine condition, and giving an indication of satisfactory combustion conditions if said measured value is not less than said predetermined threshold value.

18. A method according to claim 14 in which said step of testing for satisfactory combustion conditions comprises measuring the time taken for the rate of change of said engine condition to pass upwards through predetermined low and high threshold values thereof and comparing said measured time with at least one predetermined time period and giving an indication of satisfactory combustion conditions if said measured time is not greater than said at least one predetermined time period.

19. A method according to claim 14 in which said step of adjusting the fuel flow in accordance with the result of the testing comprises causing a decrease in fuel flow if the combustion conditions are satisfactory, and also varying the magnitude of the decrease as a function of altitude at least.

20. A method according to claim 14 in which said step of adjusting the fuel flow in accordance with the result of the testing comprises causing a decrease in fuel flow if the combustion conditions are satisfactory and also varying the magnitude of the decrease as a function of altitude and airspeed.

21. A method according to claim 17 in which the indicative engine condition is high pressure spool speed.

22. A method according to claim 18 in which the indicative engine condition is compressor exit pressure.

23. A method according to claim 17 in which the indicative engine condition is turbine gas temperature.

24. A method according to claim 14 in which said step of comparing the resulting acceleration of an engine rotor with a datum light-up acceleration schedule compares the rate of change of a high pressure spool speed with said datum.

25. A method according to claim 14 in which said step of adjusting the fuel flow in accordance with the result of the comparison maintains a constant fuel flow for as long as the actual acceleration of the rotor is the same as or greater than the datum light-up acceleration schedule, and steadily increases fuel flow so as to restore a proper acceleration level when the actual acceleration is less than the datum light-up acceleration schedule.

26. A method according to claim 14 further including utilizing a highest wins logic for enabling a normal acceleration control law to take over from the relight fuel flow schedule when accelerations under control of the former become greater than accelerations under control of the latter.

* * * * *